United States Patent [19]

Tujimura et al.

[11] Patent Number: 4,666,126
[45] Date of Patent: May 19, 1987

[54] CONTROL VALVE

[75] Inventors: Kiyoharu Tujimura; Hiroshi Ohsasa, both of Kyoto, Japan

[73] Assignee: STEC Inc., Kyoto, Japan

[21] Appl. No.: 817,255

[22] Filed: Jan. 8, 1986

[30] Foreign Application Priority Data

Jul. 23, 1985 [JP] Japan .................. 60-163386

[51] Int. Cl.$^4$ .............................. F16K 39/02
[52] U.S. Cl. ..................... 251/282; 251/333
[58] Field of Search ............ 251/282, 318, 324, 325, 251/333

[56] References Cited

U.S. PATENT DOCUMENTS

| | | | |
|---|---|---|---|
| 158,296 | 12/1874 | Matlock | 251/318 |
| 2,253,460 | 8/1941 | Hempel | 251/325 |
| 3,099,432 | 7/1963 | Zeitlin | 251/324 |
| 3,207,171 | 9/1965 | Kryman | 251/333 |
| 3,892,384 | 7/1975 | Myers | 251/282 |
| 4,477,056 | 10/1984 | Alexius | 251/282 |
| 4,500,070 | 2/1985 | Riollet et al. | 251/282 |

Primary Examiner—Martin P. Schwadron
Assistant Examiner—Sheri M. Novack
Attorney, Agent, or Firm—Wenderoth, Lind & Ponack

[57] ABSTRACT

A control valve in which a surface of a valve seat closer to a valve body is formed so as to be flat. A valve head corresponding to an annularly formed fluid-communication passage is provided with an annular inner convex projection and an annular outer convex projection. These projections engage with the flat surface of the valve seat on the inner side and the outer side of the fluid-communicating passage, respectively. The valve head is provided with a communicating passage for providing communication between a valve body-driving portion side thereof and a valve seat surface side containing the inner convex projection.

2 Claims, 5 Drawing Figures

CONTROL VALVE

BACKGROUND OF THE INVENTION

1. Field of the Invention

The present invention relates to a control valve, such as a mass flow controller or a flow-rate controlling valve, for controlling a flow rate of various kinds of fluid such as a gas and a liquid, in which a valve is controlled by a thermal expansion force or an electromagnetic force.

2. Description of the Prior Art

One control valve of this type is disclosed in Japanese Patent Publication No. 59-2879. Its valve mouth is circular in shape and a valve head corresponding thereto is formed in a conical shape or a trapezoid conical shape so that said valve head may be partially put in said valve mouth to close the valve mouth.

Although it is desired that a difference between a primary pressure and a second pressure (hereinafter referred to as differential pressure) is in almost linear proportion to a flow rate under the condition that a pressure of a fluid is constant or said differential pressure is in almost linear proportion to a flow rate under the condition that either of the primary pressure and the secondary pressure is constant in a control valve of this type, a control valve constructed in the above described manner has shown a disadvantage in that if the differential pressure exceeds a certain definite value, the flow rate is decreased, as shown by a curve A in a differential pressure-flow rate characteristic diagram of FIG. 5.

Although it is necessary only to increase the lifting quantity of a valve body in order to eliminate such a disadvantage, a fatal limitation has occurred in that said lifting quantity cannot be increased until a thermal expansion member is enlarged when said thermal expansion member is used for a valve body-driving portion.

Also, although it is necessary to reduce the heat capacity of the thermal expansion member as far as possible in order to improve a response of the control valve in its opening and closing action, in such a case the rigidity of said thermal expansion member is reduced whereby a large flow rate of fluid cannot be controlled.

SUMMARY OF THE INVENTION

The present invention was achieved in view of the above described matters. It is an object of the present invention to provide a control valve which is superior in control characteristics and response regardless of the amount of fluid to be controlled, and which is compact.

In order to achieve the above described object, a control valve according to the present invention is characterized in that a surface of a valve seat closer to a valve body is formed so as to be flat, a passage for the fluid being annularly formed, a valve head corresponding to said fluid-passage being provided with an annular inner convex projection and an annular outer convex projection, which is engaged with the surface of said valve seat on the inner side and the outer side of said fluid-passage, respectively, and said valve head being provided with a passage for providing communication between a valve body-driving portion side thereof with a valve seat surface side containing said inner convex projection.

In a control valve according to the present invention, since the fluid flows into the fluid-passage of the valve seat from not only the outside but also the inside at an inflow side thereof, if the lifting quantity of the valve body and the size of the valve seat are the same, the control range of flow rate is enlarged and if the control range is the same, the lifting quantity of the valve body and the size of the valve seat can be reduced to make the valve as a whole compact. In addition, since it is necessary only to make the valve head to be engaged with the flat surface of the valve seat in order to close the valve, the valve body can be very easily fabricated and the manufacturing cost of control valve can be reduced as much as that.

DESCRIPTION OF THE PREFERRED EMBODIMENT

One preferred embodiment of the present invention will be below described with reference to FIGS. 1 and 2.

Figure 1:
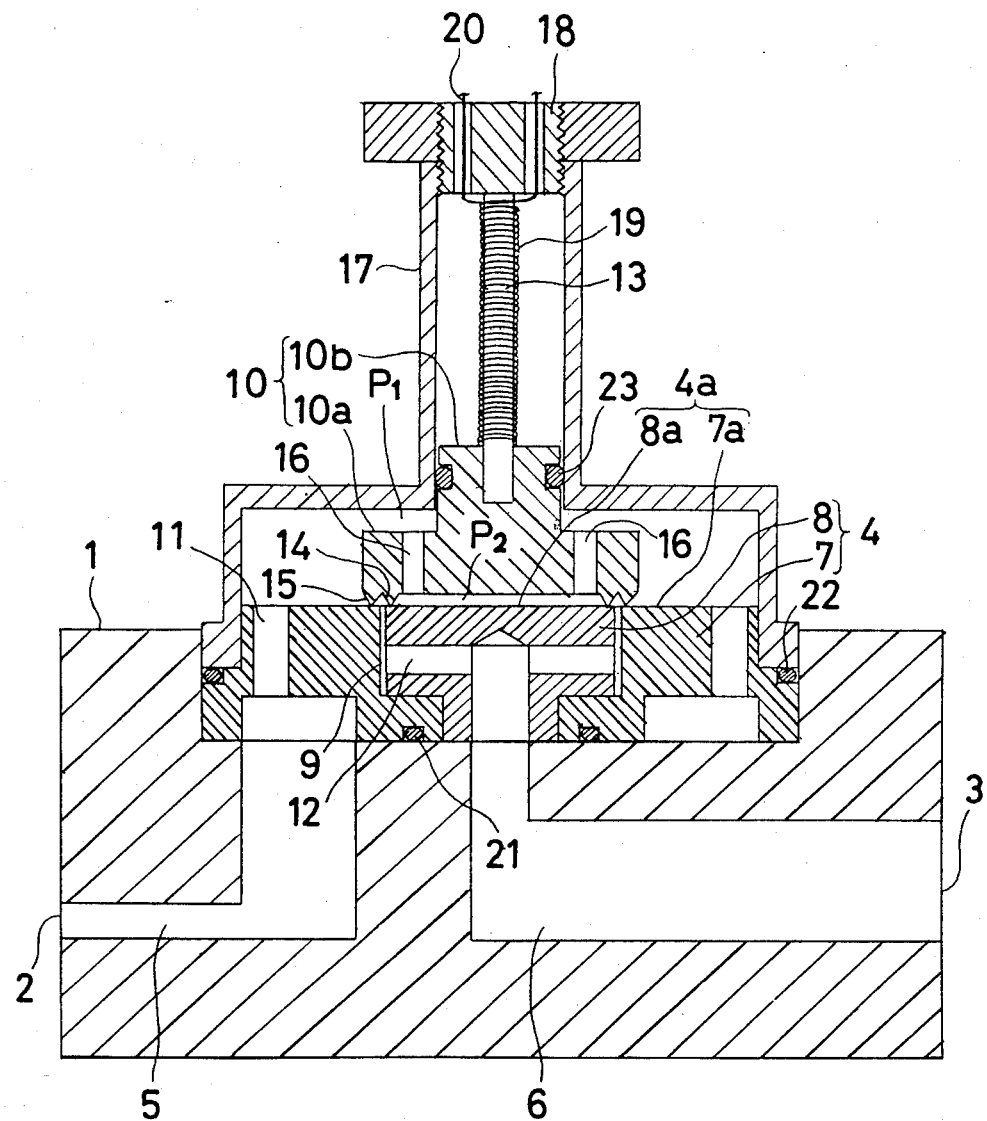
FIG. 1 is a sectional view showing a control valve according to the present invention.
Figure 2:
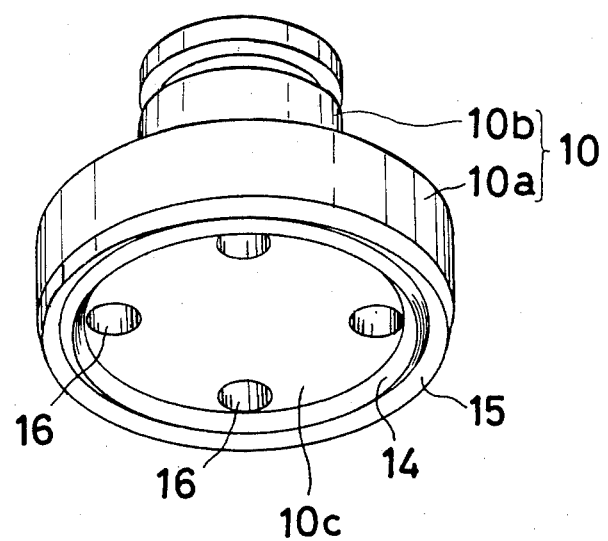
FIG. 2 is a perspective view showing an external appearance of a valve body.

Referring now to FIG. 1 showing a "normal open" type control valve, reference numeral 1 designates a valve base body. Reference numeral 2 designates a fluid inlet port and reference numeral 3 designates a fluid outlet port, a valve seat 4 being disposed between said fluid inlet port 2 and said fluid outlet port 3. Reference numerals 5 and 6 designate passages.

Valve seat 4 is composed of an outer block 7 put into the valve base body 1 and an inner block 8 put into said outer block 7, an annular fluid-passage 9 being formed between blocks 7 and 8. A surface 4a closer to a valve body 10 of the valve seat 4 is formed so as to be flat. Reference numeral 11 designates a passage for making said passage 5 communicate with the value seat surface side which is formed in the outer block 7. Also, a passage 12 provides communication between said passage 6 and the fluid-passage 9 which is formed in the inner block 8.

Valve body 10 is composed of a valve head 10a, which opens and closes said fluid-passage 9 by making it to be engaged with and deengaged from said valve seat surface 4a and a valve drum portion 10b connected to a thermal expansion member 13 serving as a valve body-driving portion. Referring to FIG. 2 showing an external appearance of the valve body 10, the valve head 10a is provided with an annular inner convex projection 14 and an annular outer convex projection 15, which is engaged with said valve seat surface 4a on the inner side and the outer side of said fluid-passage 9, respectively, formed on a surface of the valve head 10a closer to the valve seat surface 4a. Reference numeral 16 designates a passage formed in said valve head 10a for providing communication between the thermal expansion member 13 side of the valve head 10a and the valve seat surface 4a side containing said inner convex projection 14.

Thermal expansion member 13 is supported by a nut-like member 18 screwed in the upper portion of a cover member 17 and provided with a heater 19 wound around a periphery thereof, so that upon heating by the heater 19, it is expanded to dislocate said valve body 10 downward whereby a gap between both convex projections 14 and 15 and the valve seat surface 4a is narrowed. Reference numeral 20 designates a lead wire. Reference numerals 21, 22 and 23 designate sealing members such as O-rings or the like.

In a control valve constructed in the above described manner, the valve is usually opened and upon introduction of the fluid through the fluid-inlet port 2, said fluid arrives at the fluid-passage 9 through the passage 5, the communicating passage 11 and a gap between the outer convex projection 15 and an outer block surface 7a while the fluid, which passed through said communicating passage 11, arrives at the fluid-passage 9 through the communicating passage 16 and a gap between the inner convex projection 14 and an inner block surface 8a. Fluid which passes through said fluid-communicating passage 9 is led to the fluid-outlet port 3 through the communicating passage 12 and the passage 6.

At this juncture, since the fluid is introduced from not only the outside but also the inside of the fluid-communicating passage 9 on the inflow side of the fluid-communicating passage 9, a large amount of fluid can be passed through the fluid-communicating passage. Also, with the communicating passage 16 formed in the valve head 10a, a pressure $P_1$ on the valve body-driving portion side of said valve head 10a is equalized to a pressure $P_2$ on the valve seat surface side containing said inner convex projection whereby the influence of the surface pressure in the valve head 10a can be reduced to a negligible level. Particularly, this effect is increased with an increase of an area of the plane 10c within the inner convex projection 14 of the valve head 10a. Accordingly, even if the differential pressure is increased, the differential pressure is in linear proportion to the flow rate whereby the fluid can be satisfactorily controlled regardless of the amount of fluid to be controlled. Also, since the heat capacity of the thermal expansion member 13 can be reduced, a superior response can be achieved.

Figure 5:
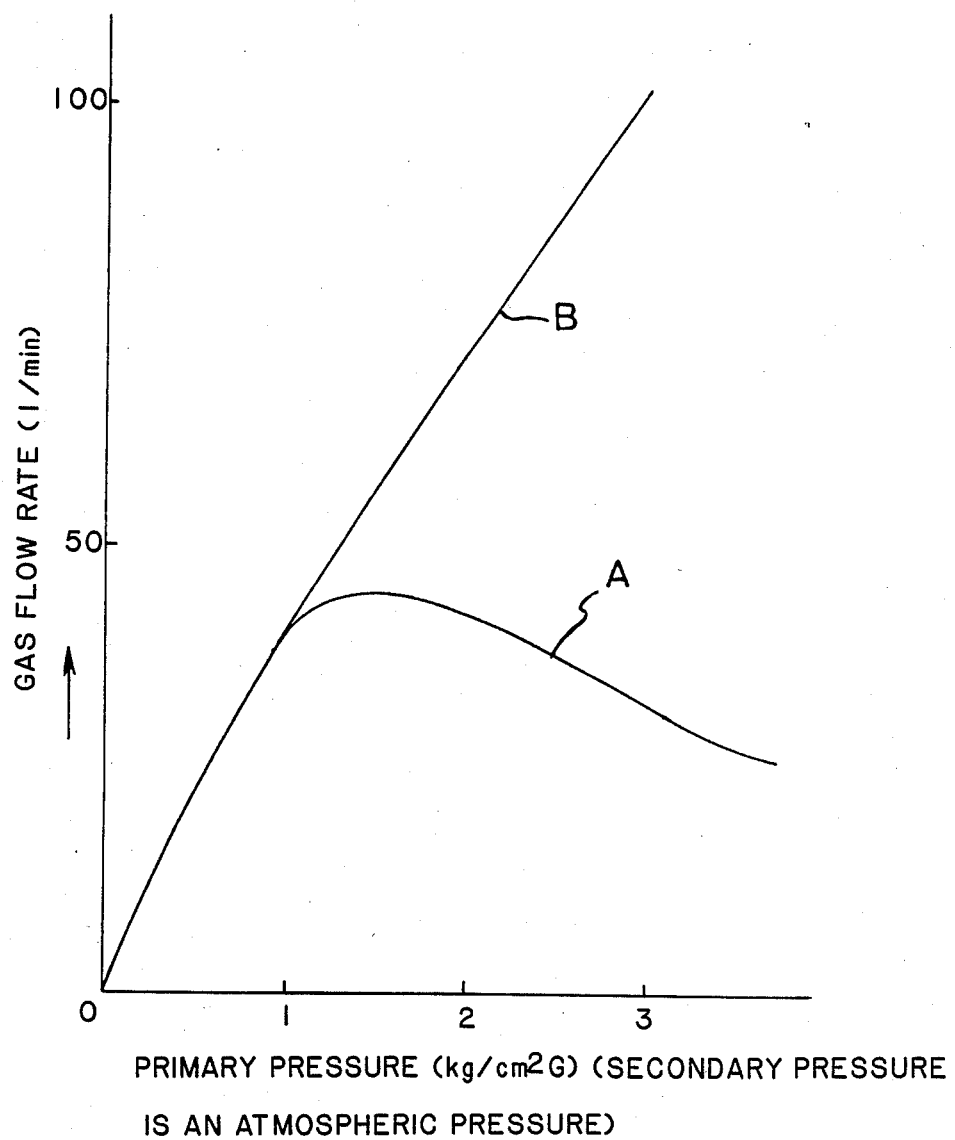
FIG. 5 is a differential pressure-flow rate characteristic diagram.

In a differential pressure and flow rate characteristic of a control valve according to the present invention, the differential pressure is in almost direct proportion to the flow rate, as shown by a curve B, which is nearly akin to a straight line, in FIG. 5.

Figure 3:
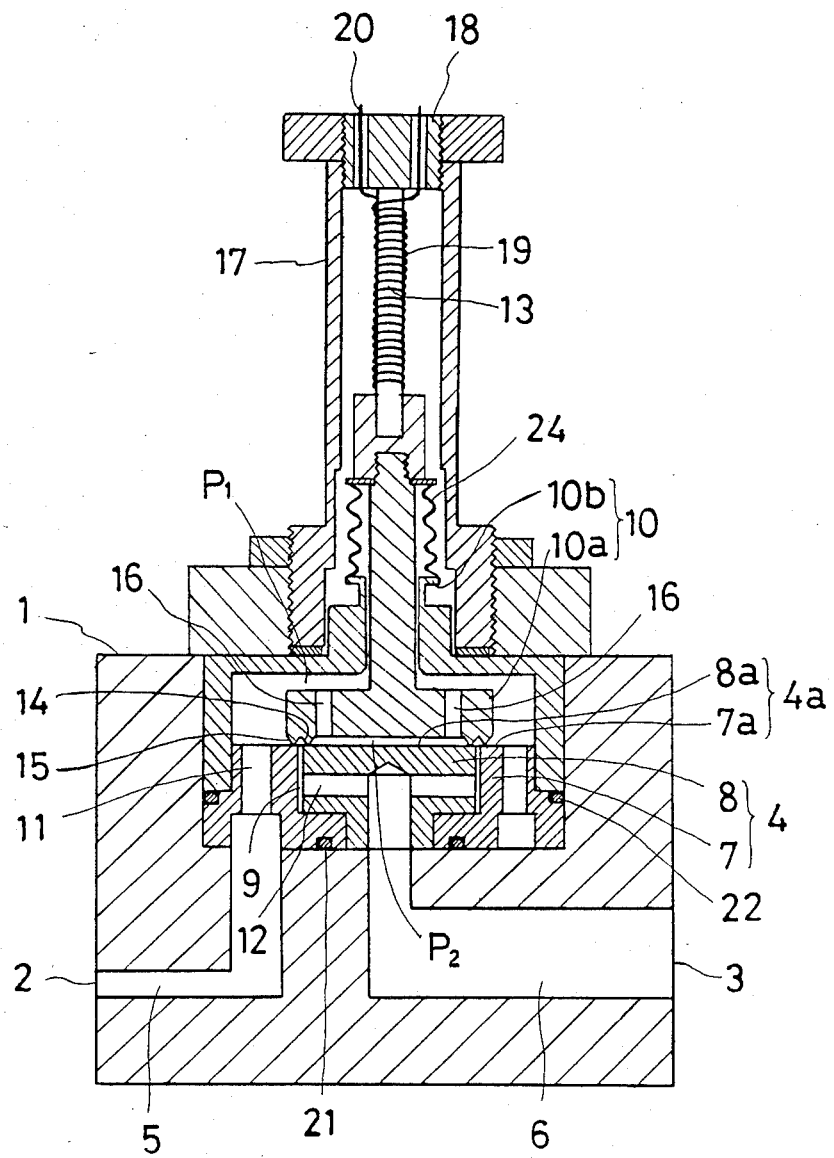
FIGS. 3 and 4 are sectional views showing other embodiments of the present invention.
Figure 4:
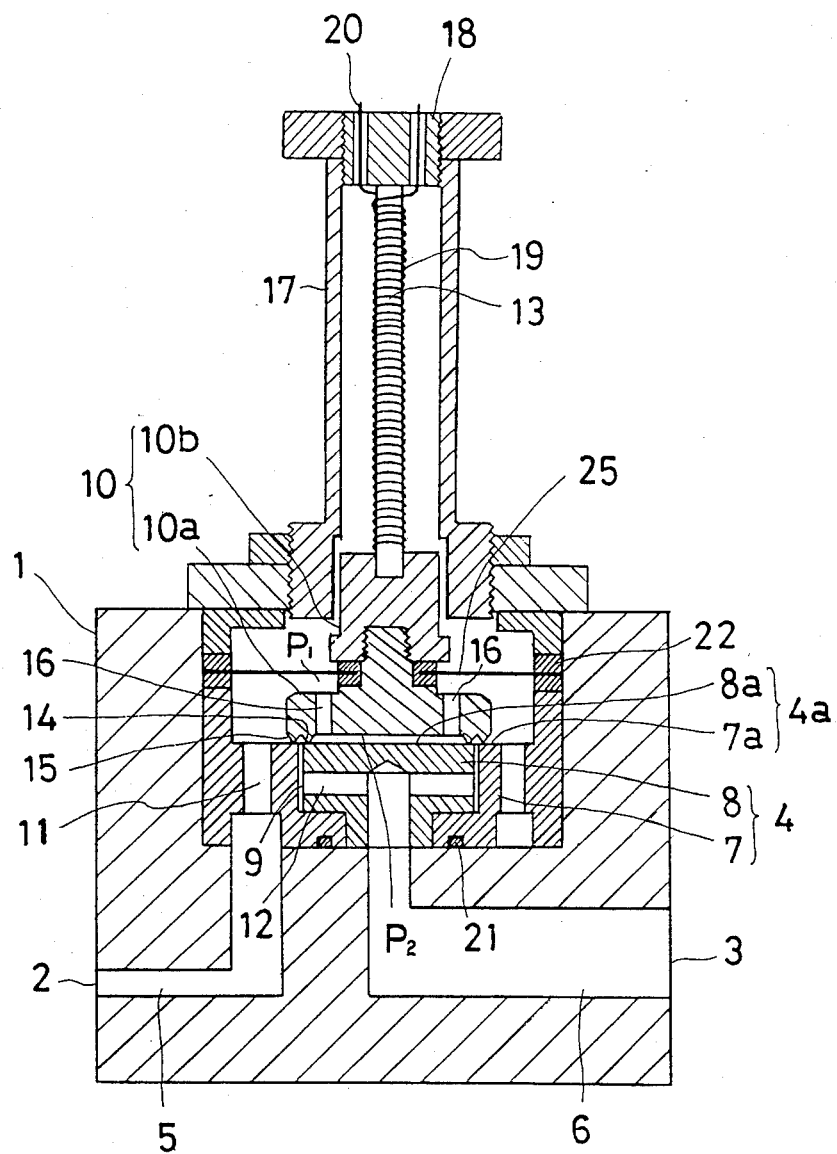

In addition, although the sealing members 23 such as O-rings are provided around the valve drum portion 10b in the above described embodiment, such constructions as shown in FIGS. 3 and 4 also may be adopted. That is to say, bellows 24 is provided so as to cover the valve drum portion 10b in FIG. 3 and a diaphragm 25 is almost horizontally provided in FIG. 4.

What is claimed is:

1. A control valve, comprising:
a valve base body having an inlet port, an outlet port, and a valve seat between said inlet port and said outlet port, said valve seat having means, including an annular passage opening into a flat exposed surface of said valve seat, for guiding a fluid from said inlet port to said outlet port via said annular passage; and
a valve head movable into and out of engagement with said flat exposed surface, said valve head having a first side communicating with one of said inlet port and said outlet port and a second side opposite said first side facing said exposed flat surface, said valve head including an inner annular convex projection and an outer annular convex projection respectively located on said second side so as to engage said flat exposed surface respectively radially inward and radially outward of said annular passage thereby to cover said annular passage and block fluid communication between said annular passage and said one of said inlet port and said outlet port when said valve head is in engagement with said flat exposed surface, said inner annular convex projection and an inner surface of said valve head bounded by said inner annular convex projection and facing said flat exposed surface defining and bounding a recess in said valve head radially inward of said inner annular convex projection, said valve head having means, including a valve head passage formed therein communicating at one end with said recess and at an other end with said first side of said valve head, for equalizing fluid pressure on said first and second sides of said valve head and for directing a portion of the fluid flow between said annular passage and said one of said inlet port and said outlet port via said valve head passage when said valve head is spaced from said flat exposed surface.

2. A control valve as in claim 1, further comprising a cover member mounted over said valve seat so as to define a space therein bounded by an inner surface of said cover member and said flat exposed surface, said valve head being movably disposed in said space, said one of said outlet port and said outlet port communicating with said first surface and said other end of said valve head passage through said space.

* * * * *